(12) United States Patent
Eromäki et al.

(10) Patent No.: US 6,523,586 B1
(45) Date of Patent: Feb. 25, 2003

(54) WEAR INDICATOR FOR VEHICLE TIRES

(75) Inventors: Pentti Eromäki, Nokia (FI); Henri Kossi, Nokia (FI); Jouni Raatikainen, Lempäälä (FI)

(73) Assignee: Nokian Tyres PLC, Nokia (FI)

(*) Notice: Subject to any disclaimer, the term of this patent is extended or adjusted under 35 U.S.C. 154(b) by 18 days.

(21) Appl. No.: 09/602,209

(22) Filed: Jun. 23, 2000

(30) Foreign Application Priority Data

Jun. 29, 1999 (FI) .................................................. 991479
Jan. 20, 2000 (FI) ............................................. 20000113

(51) Int. Cl.[7] .......................... B60C 11/12; B60C 11/24
(52) U.S. Cl. ............................. 152/154.2; 152/209.18; 152/209.22; 152/DIG. 3
(58) Field of Search ...................... 152/209.18, 209.19, 152/209.22, 209.21, DIG. 3, 154.2

(56) References Cited

U.S. PATENT DOCUMENTS

| | | | |
|---|---|---|---|
| 2,706,509 A | | 4/1955 | White |
| 3,833,040 A | * | 9/1974 | Bins .......................... 152/154.2 |
| 4,154,564 A | | 5/1979 | French |
| 4,226,274 A | * | 10/1980 | Awaya et al. ............. 152/154.2 |
| 6,003,576 A | * | 12/1999 | Auxerre et al. ........... 152/154.2 |

FOREIGN PATENT DOCUMENTS

| | | | |
|---|---|---|---|
| DE | 3627832 | | 8/1986 |
| EP | 0250113 | | 12/1987 |
| EP | 0 667 251 A1 | | 8/1995 |
| FI | 336/72 | | 8/1973 |
| GB | 1 364 988 | | 8/1974 |
| JP | 61-202902 | * | 9/1986 ............ 152/209.22 |
| JP | 10-44719 | * | 2/1998 ............ 152/209.19 |
| JP | 2000-289414 | * | 10/2000 ............. 152/154.2 |
| WO | WO97/47483 | | 12/1997 |

OTHER PUBLICATIONS

Abstracts for German 3627832.*

* cited by examiner

Primary Examiner—Steven D. Maki
(74) Attorney, Agent, or Firm—Klarquist Sparkman, LLP

(57) ABSTRACT

The present invention relates to a wear indicator for a vehicle tire (1), the tread of said tire being provided with grooves (2) to improve the grip. As taught by the invention, the surface of the tread in contact with the road surface is provided with indicators (5) indicating the momentary groove depth (H) of the tire, said indicators forming at least one group of elements and extending in radial direction into the tire. The element depth grows by predetermined steps from the shortest element to the longest element. The indicator is formed from a sipe(5) the depth of which is advantageously smaller than the depth (H) of said groove and the cross-section of which in the direction of the tread forms a number, letter, sign or symbol, image or equivalent determining the groove depth of the tread on the height of the plane in the direction of the tread which is tangential to the bottom (2p) of the capillary groove.

25 Claims, 6 Drawing Sheets

WEAR INDICATOR FOR VEHICLE TIRES

The present invention relates to a wear indicator for vehicle tyres.

The grooving of tyres has an essential impact on the grip of the vehicle in dry, and particularly in wet road conditions. From the point of view of safe driving, it is important to monitor wearing of tyres and reduction of the groove depth so that a groove which has worn down and become too low would not cause a surprise in poor road conditions. Also a given groove depth in the tyres is required for a car to be in appropriate condition for inspection.

For following up the wear of a tyre, various tyre structures have been developed:

In patent specification WO-97/47483 a tyre structure is known the wearing of which can be followed by means of wear indicators disposed in the tread, and therethrough learn when the location of a tyre in the vehicle should be changed. The wear indicators are recesses formed in the tread, extending to different depths or protruding parts formed to be in conjunction with the grooves and extending to different depths. The wear indicators are spread on the entire circumference of the tyre. The depths of consecutive indicators will grow uniformly from the lowest to the deepest. When the wear of a tyre has been continuing so long that some of the indicators have worn off and the pattern formed by the indicators has therefore changed, we know that the location of the tyre should be changed. The wear indicators do not indicate anything of the groove depth.

In patent specification No. DE-OS-36 27 832, a tyre structure is known the wearing of which can be followed on the basis of the wearing of a stepped structure formed on the tread, preferably to be in conjunction with grooves. A kind of marking is made on the step levels of the stepped structure, for instance unending numbering.

However, the numbering of the step levels will not indicate anything of the depth of the groove. For instance, when steps 3 and 4 are visible in the tread, it is possible to conclude on the basis of the lowermost number "4" that the tread had included four steps altogether, but what this means relative to the overall wear and how much of the groove depth still remains will not become apparent.

In patent specification No. U.S. Pat. No. 2,706,509, a tyre structure is known in which wear indicators have been formed on one wall or on the opposite walls of a groove. The indicators are step-wise formed so that each step is of equal height and extends from the tread to the bottom of the-groove. The remaining groove depth is equal to the number of the remaining intact steps multiplied by the depth of the step plus the remaining depth of the step in the tread. The depth of one step or the number of the steps have not, however, been visibly marked in the steps. Because of the soiling of the tyre and the grooves being filled with soil it is difficult to examine the steps. For instance, the numbers in FIG. 5, which belong to different steps, are not measurement values but merely reference numbers of steps. When the tread extends to line 17, nine step surfaces 1 to 9 are remaining. Assuming that not a single step surface has worn off, each step height is equal to one tenth of the entire groove depth. Hence, nine full tenth parts of the groove depths are left plus one partly worn topmost step. Consequently, the wearing is something between zero and one tenth.

In patent specification No. EP-250,113 A3, tyre wear indicators are known which are formed from capillary slits of different depths and assembled into groups which have been divided across the tread on different sides of the middle line in circumference direction. Within a group, the capillary slits are mutually of the equal length. The function of the indicators is to indicate the uneven wearing of the tyre. This is carried out so that when a tyre is balanced and is wearing down evenly on both sides of the middle line in circumference direction, the tread pattern formed by the indicator groups also changes symmetrically, that is, the shortest capillary slits, mutually of equal depth, on both sides of the middle line, disappear simultaneously from the tread. When a tyre wears unevenly, the tread pattern starts to change on the side of the tyre which wears more before the tread pattern on the other side of the tyre changes. The wear indicators do not yield any information on the amount of reduction of the groove depth.

The objective of the present invention is to produce a tyre structure which is provided with indicators indicating the groove depth, on the basis of which the groove depth of the tread can easily be estimated at each time, i.e. at the moment in question.

This is accomplished with a tyre having the features described below.

In the surface part of tyre tread pattern pieces or of ribs, which are in contact with the road surface, indicators are formed in the form of sipes or grooves, extending radially into the tyre. The cross-section in the direction of the tread of the sipe represents a number informing of the groove depth of the tread in the plane in the tread direction tangential to the bottom of said indicator. Thus, the visible cross-sectional shape of the sipe indicates the groove depth in the plane of the sipe bottom as a numerical value.

According to an advantageous embodiment of the invention, the indicators form at least one group of indicators. The depth of each indicator belonging to an indicator group increases by predetermined steps, so that, respectively, the groove depth in the bottom plane of the indicator is smallest below the deepest capillary groove, growing therefrom by equal steps towards the greatest depth. The informing cross-section diagrams of the indicator group represent, for instance in numbers 2, 4, 6, 8, 10 or 2, 4, 8, 12, 16 the groove depth below the indicator. In the former case, the groove depth grows in equal steps and in the latter, first by two and after that by four units, advantageously by millimeter. It is certainly more important to receive more specific information about the groove depth the closer the depth is to the permitted lower limit, whereas when a less worn tyre is in question, it is not essential to know the degree of wearing with the same accuracy.

According to an advantageous embodiment of the invention, the deepest indicator is at most as deep as the groove of the tread, but advantageously at least 1 to 2 mm lower than that so that it will give a warning of the small remaining groove depth.

According to an advantageous embodiment of the invention, the indicator capillary grooves are formed at sufficient spaces in the tread so that in the tyre cast phase, rubber mass may enter into all spaces formed by lamellae. A sufficient space between the indicators is approximately equal to the greatest dimension of the cross-section image of individual indicators.

According to an advantageous embodiment of the invention, the tread is preferably provided with two or more identical indicator groups, spread on both sides of the middle line in circumference direction of the tyre and/or approximately at equal spaces on the entire tyre circumference. Hence, one group of indicators is always located in a visible location, irrespective of the fact in which wheel the tyre is located and where the inspector is standing.

According to an advantageous embodiment of the invention, the indicators are Arabic or Roman numerals or numerals of any other numerical system or other graphic signs, symbols or images. Letters or characters can be used as graphic signs. Thereby, the information provided by letters concerning the groove depth can be expressed in words describing the condition of the tyre. The letters forming one word always extend to the same groove depth. The condition of a tyre can be described, for instance with words "VERY GOOD CONDITION", so that the letters of the word "VERY" always extend only a little distance into the tread, and the letters of the words "GOOD CONDITION" extend deep, for instance to a plane in which only 3 mm of the groove depth is left. The letters of "VERY" wear at a relatively early stage off so that the tyre indicates then "GOOD CONDITION".

While in this condition, the tyre can be used for driving for a relatively long time, and it is not until only 3 mm of the groove depth is left, the words "GOOD CONDITION" wear off.

According to an advantageous embodiment, the indicators can be of the shape of W and S. The letters W wear down more rapidly so that the letters S which extend deeper remain. The mere S indicators show that a tyre originally appropriate for winter tyre (W+S) is merely in summer tyre condition.

According to an advantageous embodiment, for the indicator a well-known "smiling mouth" image can be used, with a round face, two spots for eyes and a smiling mouth. The indicators are formed from a smiling mouth indicator and a sorry mouth indicator, and possibly also from a straight mouth indicator. The smiling mouth extends only a little bit into the tread so that the smiling condition of the tyre is over after the smiling mouth indicator has worn off from the surface. The sorry mouth indicator and possibly the straight mouth indicator are left there. When the alarming sorry mouth indicator alone is visible, it is time to replace the tyre.

According to an advantageous embodiment, the surface of one piece or preferably of more tread pattern pieces is provided with indicators representing a series of numbers. The series of numbers are advantageously growing from the margin towards the middle line, so that the numbers in the middle, indicating a greater depth, are the first ones to wear off from the surface. Various tread pattern pieces may be provided with the same series or different series of numbers, so that the different series of numbers disappear from the surface at different speeds. When such number series indicators are disposed in adjacent tread pattern pieces in the width direction of the tyre, information is received, not only about groove wear but also about potential uneven wear. Individual numbers are provided advantageously in the form of capillary grooves being mutually apart. Capillary grooves extending across the pattern piece can be provided between rows of numbers.

According to another advantageous embodiment of the invention, the indicators indicating the groove depth have been formed in a groove, in the upper surface of a piece formed between the walls bordering the groove, said upper surface being planar and parallel to the tread.

This is appropriate particularly for winter tyres, the tread pattern pieces of which already have been provided a plurality of capillary grooves for enhancing the grip to the road. Forming additional grooves in tread pattern pieces of a winter tyre may cause that the tyre becomes unstable and, in addition, the tread pattern of the tread would suffer from it. Also making a mould for the tyre becomes more difficult and the casting is not always successful either. When forming indicators in a piece like that in a groove between the tread pattern pieces, the tread pattern shaping of the tread will not suffer therefrom. With the exception of the location, the indicators formed in a groove piece are similar to the indicators described above, being formed in the wear surface.

According to an advantageous embodiment, the piece formed in the groove is only attached on one wall bordering the groove and detached from the opposite wall, which is preferable concerning the grip to the road.

According to an advantageous embodiment, the piece formed in a groove is stepped, which is similarly preferable concerning the grip to the road. One indicator of one indicator group has been formed in each step.

As the indicator acting as a wear warning according to the invention, a series of numbers is preferred which clearly indicates the groove depth remaining in the bottom plane of each capillary groove. If a series of numbers with the highest number 5 can be seen on the tread of a slightly worn tyre, it means that 5 mm or five of other measuring units of groove depth plus the height remaining in the sipe are remaining.

A great advantage of a tyre according to the invention compared with other corresponding structures known in prior art is that the pattern formed by the indicators in the tread can easily be checked, and it will tell directly the condition of the wear surface at each moment by means of measuring figures, words or images.

As a matter of fact, the words can be in any language and in any letters or characters as long as they can be understood to indicate the remaining groove depth of the tread as a measuring figure or in proportion to the acceptable measuring figures determined by legislation.

Indicators in the form of sipes can, according to the invention, be used both in summer and winter tyres. In a summer tyre, they are generally disposed in ribs in circumferential direction, and in a winter tyre, they are fitted in ribs and/or in the surface of tread pattern pieces or in grooves between tread pattern pieces. They are advantageously fitted between other capillary grooves or possibly in conjunction therewith. When the indicators are disposed in winter tyres grooves, in groove pieces located in the grooves, the capillary indicator grooves will not cause any trouble in providing tread pattern pieces with other capillary grooves to increase the grip to the road. When positioning indicators in a tread pattern piece of a winter tyre, they contribute to the grip of the tyre to the road and make it better.

Indicators of different types are provided using the lamination technique of the invention. Lamellae corresponding to indicators are disposed in the segments of a tyre mould so that corresponding indicators in the form of capillary grooves are formed in the finished tyre. The production is simple and the sipe indicators will not increase significantly the tyre production costs.

Below, a number of advantageous embodiments of the tyre of the invention are described, reference being made to the accompanying figures, in which FIG. 1 presents in an outline 3D image part of a summer tyre provided with indicators of the invention;

FIG. 2 presents in top view the tyre of FIG. 1, viewed in axial direction;

FIG. 3 presents a vertical section of FIG. 2 along line III—III;

FIG. 4 presents a vertical section of FIG. 1 along line IV—IV;

FIG. 5*a* presents a top view of a tyre of another embodiment viewed in peripheral direction;

FIG. 5*b* presents in top view a diagram of a number row formed by indicators and of groove depths indicated by the numbers, of the height dimensions of the numbers and of the dimensions of the spaces between the numbers for producing a mould;

FIG. 6 presents in an outline 3D image part of a summer tyre provided with information in words;

Figure 8:
Figure 9:
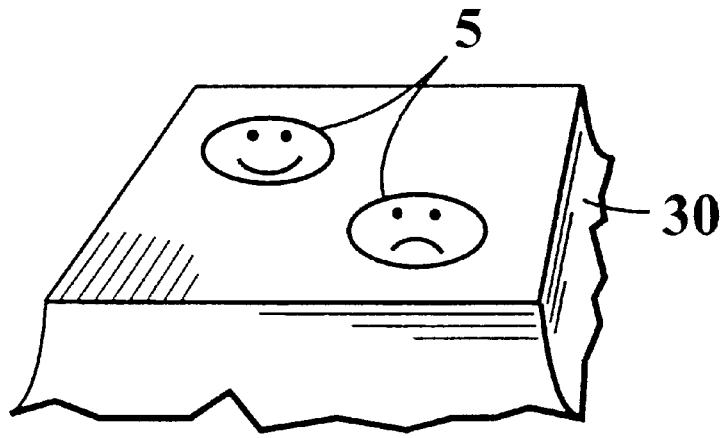
Figure 10:
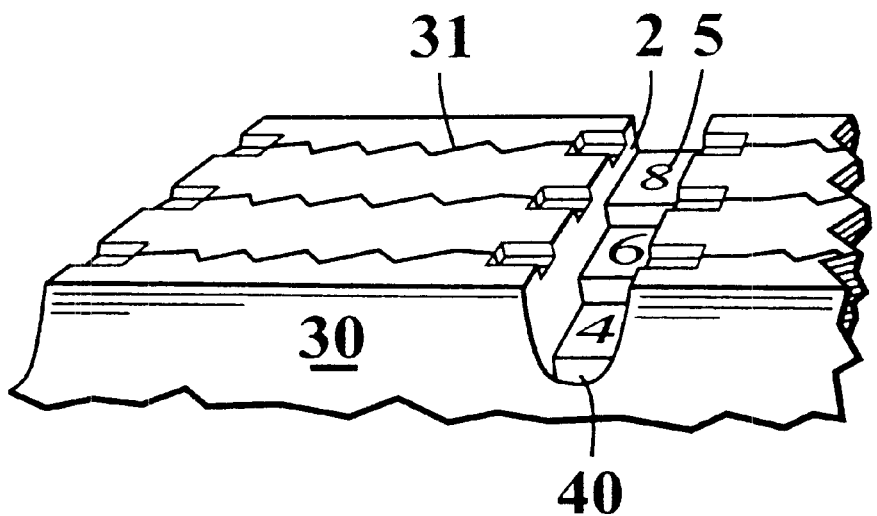
Figure 11:
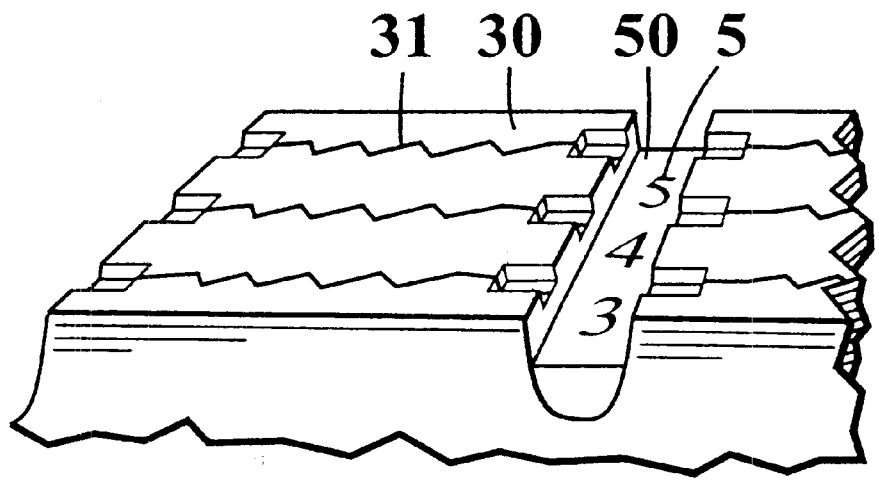

FIG. 8 presents in an outline 3D image a tread pattern piece of a winter tyre, the tread whereof being provided with indicators in numbers, representing letters S and W in rows;

FIG. 9 presents in an outline 3D image two tread pattern pieces of a winter tyre, the tread whereof being provided with a smiling mouth indicator and a sorry mouth indicator;

FIG. 10 presents in an outline 3D image a tread pattern piece of winter tyre and a groove therebetween, between the walls of which stepped groove piece for indicators is formed, and FIG. 11 presents in an outline 3D image two tread pattern pieces of a winter tyre and a groove therebetween, between the walls of which a planar groove piece for indicators is formed.

Figure 1:
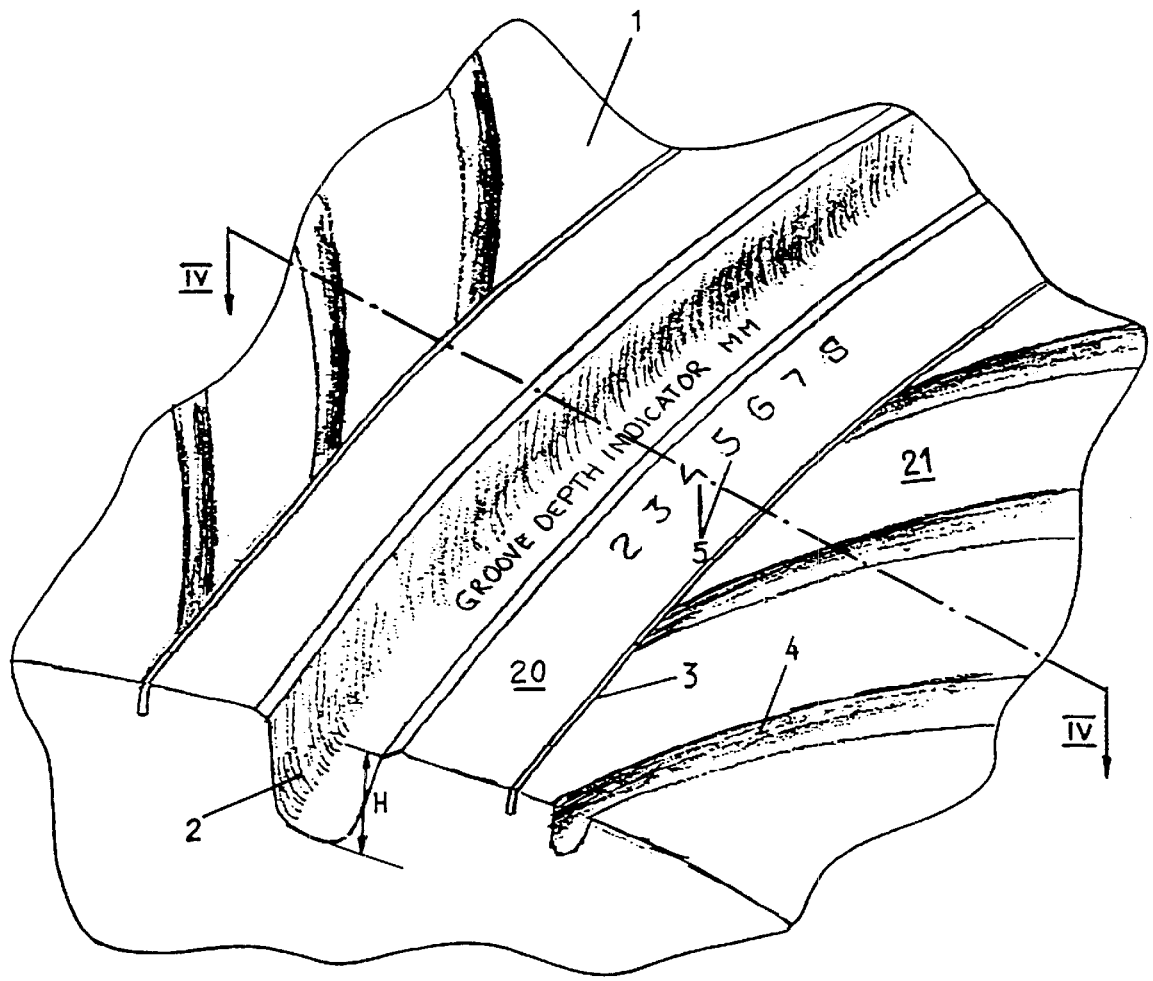
Figure 2:
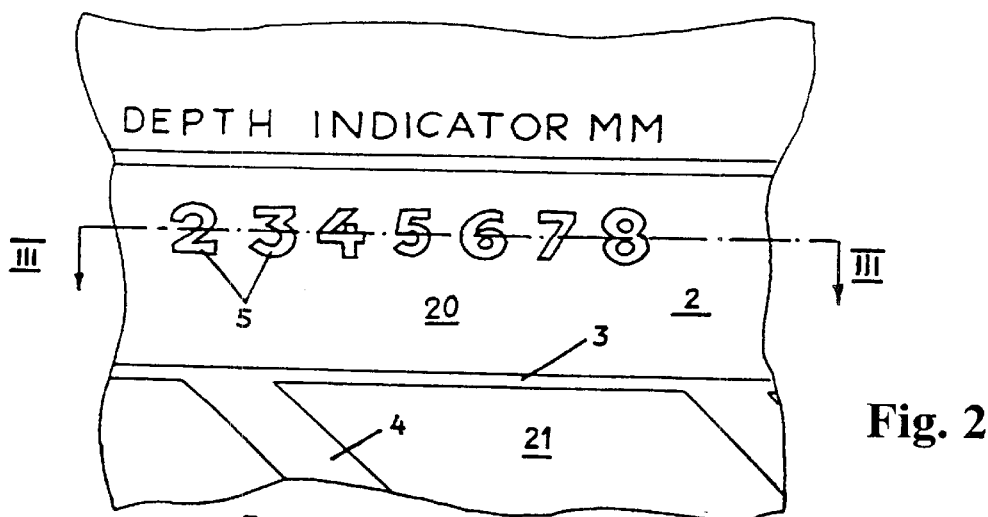
Figure 3:
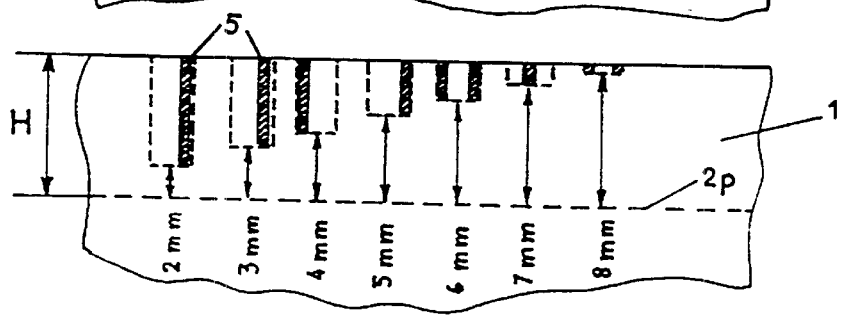

FIG. 1 presents a part 1 of a summer tyre in an outline 3D image. A groove 2 in circumferential direction between the tread pattern pieces is shown in the middle of the figure, and in parallel direction therewith, two capillary grooves 3 are running in the tread pattern pieces, to which grooves the main grooves 4 in the tyre lead, said main grooves being formed as curved slanted grooves. The ribs in the circumferential direction on both sides of the groove 2 are marked with reference numeral 20 and the tread pieces between the slanted grooves are marked with reference numeral 21. Groove 2 is one of the grooves the depth H of which is monitored and which are required to meet the statutory depth values. In the figure the tyre part 1 is new and totally unworn. On the bottom of the groove 2 it reads "GROOVE DEPTH INDICATOR MM". On the smooth tread part adjacent to the groove 2 a row of numbers "2 3 4 5 6 7 8", formed by indicators 5 parallel with the groove 2 is shown. Indicators 2 to 8 are formed from capillary grooves 5 being numbers in cross-section. FIG. 2 shows the row of numbers and the immediate adjacency thereof in top view. FIG. 3 shows the row of numbers in vertical section along line III—III of FIG. 2, and the depths of different indicators 5. FIG. 3 illustrates how there are 2 mm between the bottom of the deepest sipe representing number "2" and the line 2p indicating the bottom of the groove 2, 3 mm respectively between the bottom of the sipe and the line 2p, and finally, 8 mm between the bottom of the sipe representing number "8" and the line 2p.

Figure 4:
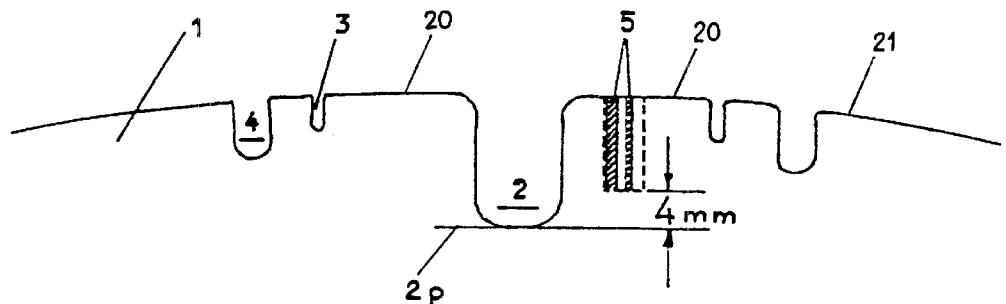

When the tread wears down in driving, the sign indicating number "8" disappears first, so that there are not 8 mm of the groove depth left, but the depth indicating the next number "7" added with the part of the step between "8" and "8", that is, more than 7 mm. For instance, after the three lowest indicates 5 have worn off from the tread, the indicator indicating "5" plus its adjacent deeper indicators, indicating a smaller depth, are visible. At that point, more than 5 mm of the groove depth is left, that is, over 5 mm but less than 6 mm. When only the last indicator is left, we know that the groove depth is a bit over 2 mm. When the indicator indicating number "2" is disappearing from the tread, we know that the minimum depth of the groove is close and that it is time to replace the old tyres. FIG. 4 which is a vertical section made along line IV—IV of FIG. 1 presents the sipe 5 illustrating indicator "4". The height between the bottom line of the sipe and the bottom line 2p of the groove 2 is 4 mm. When this sipe has just worn off, a groove depth of 4 mm is left in the tread.

Figure 5A:
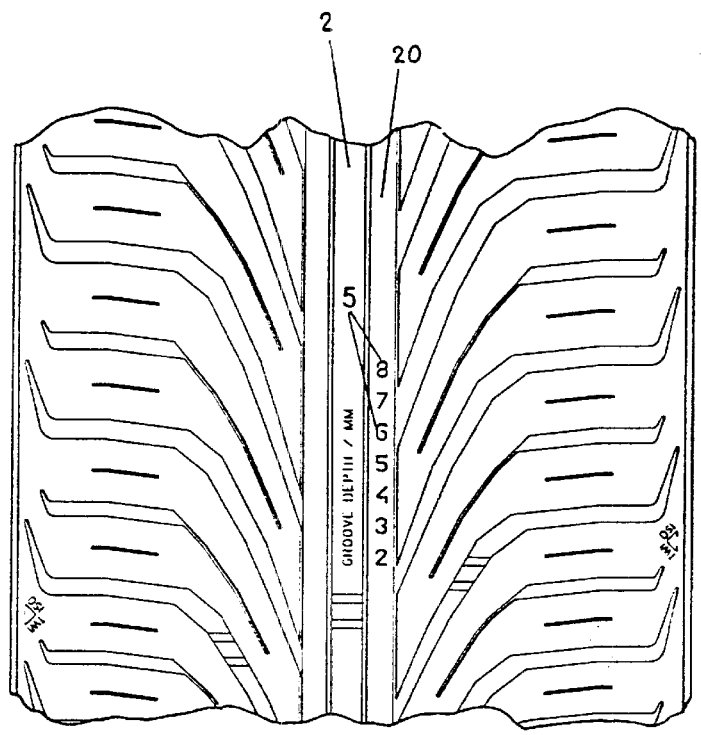

FIG. 5a shows an embodiment similar to FIGS. 1 to 5, with the difference, however, that the indicators 5 illustrating numbers can be read in the circumferential direction of the tyre when in the preceding embodiment they can be read in the axial direction of the tyre. On both margins of the tread a small triangle is moreover added and letter abbreviations TWI (TREADWEAR INDICATOR) and DSI (DRIVING SAFETY) showing where the indicators indicating the tread wear can be found.

Figure 5B:
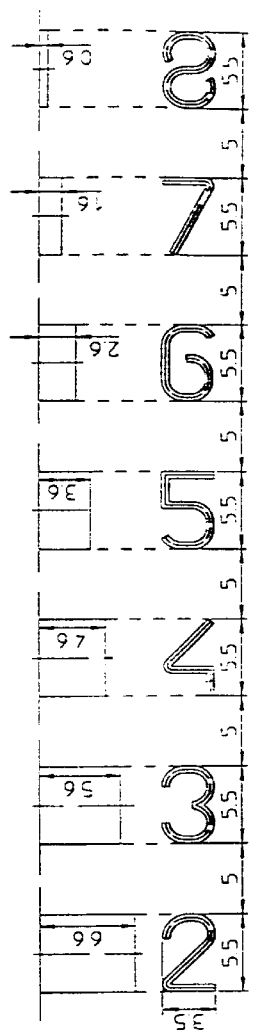

FIG. 5b presents the depth figures of the indicators for making the mould; at number "8" the sign depth is 0.6 mm and the groove depth therebelow is 8 mm, at number "7", respectively, 1.6 mm and 7 mm, and at number "2" respectively, 6.6 mm and 2 mm. The lamellae forming the indicators are required to be of this height. The depth of the groove in said tyre is 8.6 mm. The height of indicators is 5.5 mm and the space therebetween is 5 mm. It becomes obvious from the figure that the capillary grooves 5 representing the numbers have been formulated into open numbers so that neither any very narrow gap nor a closed formation is formed anywhere into which it is difficult or impossible for the rubber mass to enter. For instance, number "8" has been made open on both sides.

When number 2 only is visible, 2 mm plus part of the sign space 1 mm of the groove depth are left. At this point, the tyre change is soon coming timely. As regards summer tyres, the groove depth is required to be at least 1.6 mm according to the statutes internationally in force. When number "2" is just disappearing from the tread, 2 mm of the groove depth is left, so that merely 0.4 mm reserve is left for tyre change.

Figure 6:
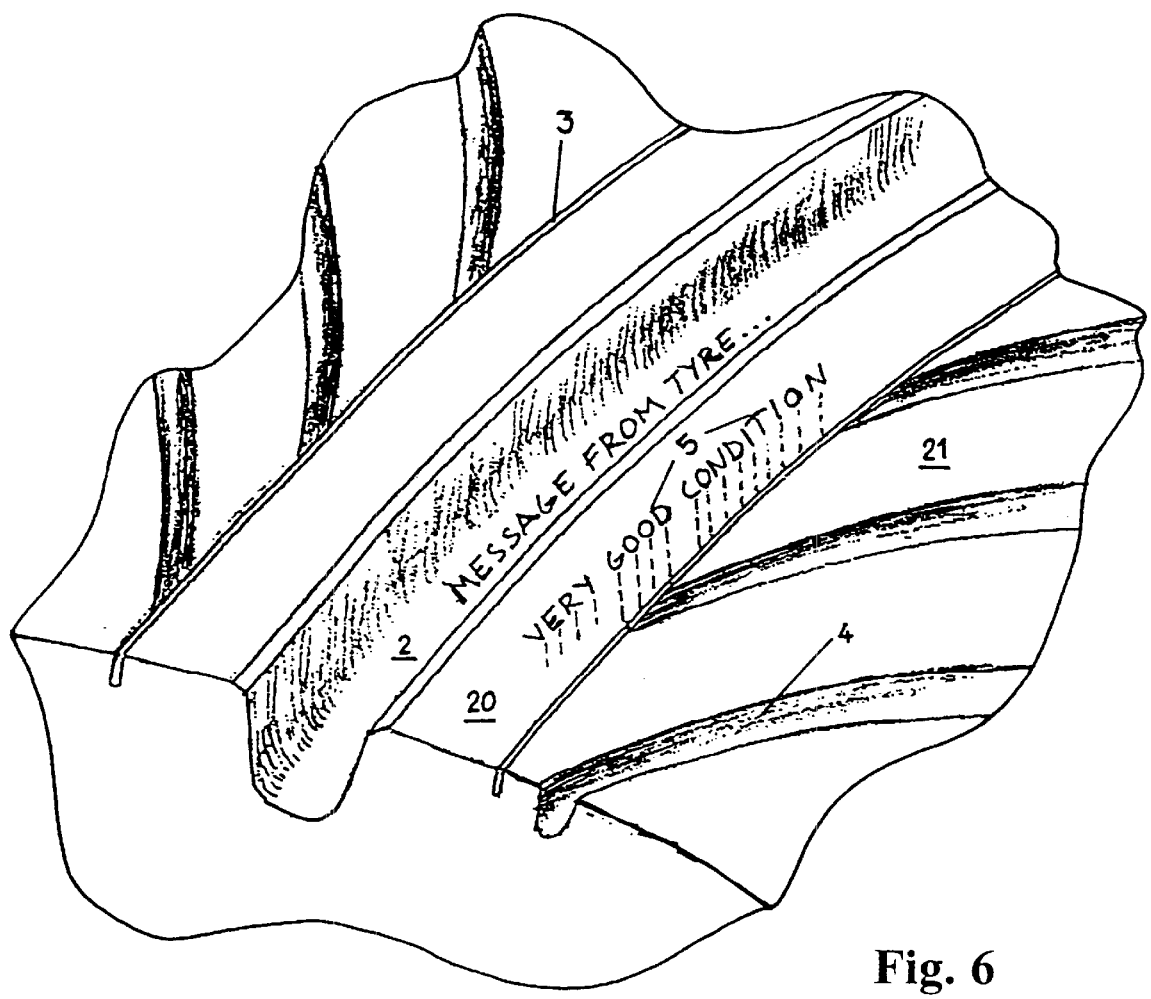

FIG. 6 shows information formed from words "very good condition" in rib 20. An outline is depicted with vertical broken lines in the figure to show how the word "very" has a smaller depth and the words "good condition" have a greater depth, this being mutually the same depth.

At the bottom of the groove 2 of the tyre reads a non-abrasive message "Message from tyre". The message can be, for instance, depressed on the surface of the groove or it can be cast on the surface of the rubber. In a new or only slightly worn tyre, information "very good condition" can be read, and in a more worn tyre respectively, "good condition". When no information can be seen in the tyre, it is time to change the tyre.

Figure 7A:
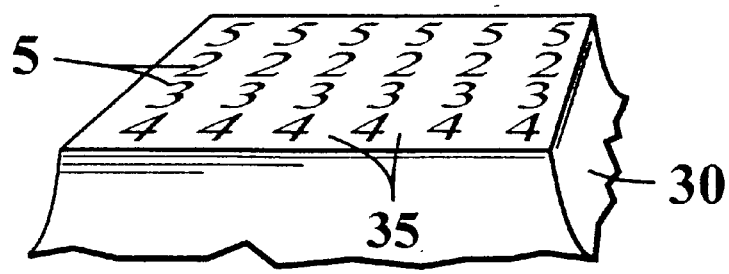
FIG. 7a shows in an outline 3D image a tread pattern piece of a winter tyre, the tread whereof being provided with indicators in numbers, being in each indicator row the same number.

FIG. 7a presents an embodiment of a tread pattern piece 30 of a winter tyre in which the indicator rows 35 are formed merely from three detached, mutually identical numbers. This kind of arrangement reveals easily uneven wear of the tread in the axial direction of the tread.

Figure 7B:
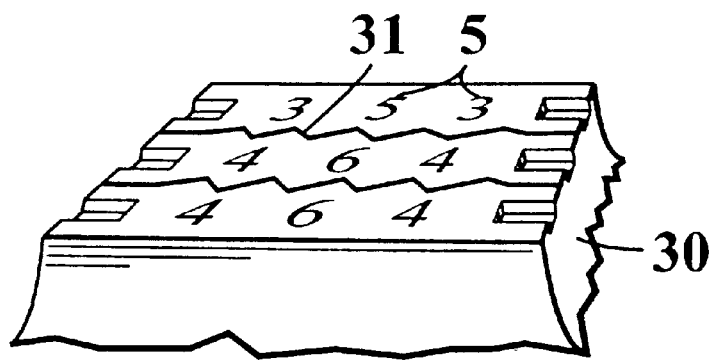
FIG. 7b shows in an outline 3D image a tread pattern piece of a winter tyre, the tread whereof being provided with indicators in numbers, said indicators being formed between the capillary grooves of the tread pattern piece.

FIG. 7b presents another embodiment of a tread pattern piece 30 of a winter tyre in which the indicator rows 35 are formed merely from three sparsely disposed indicators 5 and capillary grooves 31 between the indicator rows. Each indicator row is provided with numbers of different sizes and their numerical value is greatest at the middle line of the tread pattern piece and smaller at the margins. Two rows of the indicators are mutually identical and one is different.

FIG. 8 presents another embodiment of a tread pattern piece 30 of a winter tyre in which indicator rows are formed from letters S and letters W. After the W letters have worn off from the surface, the letters S are still visible and indicate that the tyre is acceptable for summer driving but no longer for winter driving.

FIG. 9 presents another embodiment of the tread pattern piece 30 of a winter tyre in which a smiling mouth indicator and a sorry mouth indicator have been formed in the tread. When the smiling mouth starts to disappear from the tread, the groove depth of the tyre is approaching the acceptance limit, and when the sorry mouth disappears from the surface, the tyre must not be used.

FIG. 10 presents an embodiment of the tread pattern piece 30 of a winter tyre in which a stepped groove piece 40 is formed in the circumferential groove 2 between two tread pattern pieces, said piece being even at its highest point lower than the tread. The desired indicator numbers can easily be formed in the groove piece without paying attention to the sipe formation of the tread pattern piece. That is to say, sipes cannot be formed densely in tread pattern pieces because that would make the tyre unstable and would deteriorate the driving properties of the tyre significantly.

The groove piece of FIG. 10 is attached merely on one groove wall and unattached from the opposite groove wall. This will improve the grip of the tyre. Indicator "8" is included in the highest groove piece step, indicator "6" in the next and indicator "4" in the lowest step. After the indicator "4" has worn off, less than 4 mm of the groove depth is left and the moment of changing the tyre is approaching.

FIG. 11 presents a modification of the preceding embodiment. A planar groove piece 50 has been formed in the groove 2 between the tread pattern pieces, in which an indicator row is formed, containing numbers "3–5" indicating various groove depths. The production mould of this kind of tread is simpler and the casting succeeds more easily but the driving properties of the tread in winter conditions are not equally good because, as regards that aspect, the groove 2 is filled.

As becomes obvious from the facts above, a plurality of modifications are available. In addition to those mentioned in the preceding, various other wear indicators according to the claims below can be found.

What is claimed is:

1. Tyre tread for vehicle tyre, said tread being provided with main grooves and with tread pattern pieces, circumferential ribs and/or tread pieces, the surface of said tread pattern pieces, ribs and/or tread pieces being in contact with a road are provided with indicators indicating groove depth of a main groove and having the form of sipes, said indicators extending radially into the tyre tread, and the cross-section of each indicator in the direction of the tread surface being formed into a number, characterized in that the number extends over the whole radial extension of the indicator and directly denotes a minimum remaining depth of the main groove, whereby each indicator disappears from the tread when wearing of the tread has advanced to the groove depth indicated by the number of the indicator, and that a momentary groove depth can be read from those indicators of the indicators still remaining in the tread which have the number disclosing the highest value.

2. Tyre tread for vehicle tyre according to claim 1, characterized in that the indicators from at least one group of indicators and that the depth of each indicator of a group increases at predetermined steps from the lowest depth to the deepest depth.

3. Tyre tread for vehicle tyre according to claim 2, characterized in that the depth of each indicator of an indicator group increases evenly from the lowest indicator to the deepest indicator.

4. Tyre tread for vehicle tyre according to claim 2, characterized in that the depth of each indicator of an indicator group increases unevenly from the lowest indicator to the deepest indicator so that the growing step is less at the deeper indicators and greater at the lower indicators.

5. Tyre tread for vehicle tyre according to claim 1, characterized in that the deepest indicators are at most equally deep as the main grooves so that they are able to warn of a small remaining groove depth.

6. Tyre tread for vehicle tyre according to claim 1, characterized in that for securing a good result in casting the tyre, the distance between the indicators in the tread is approximately the same as the greatest dimension of an individual indicator in the tread.

7. Tyre tread for vehicle tyre according to claim 1, characterized in that the tread is provided with two or more mutually identical groups of indicators placed on different sides of a circumferential middle line of the tyre tread and/or approximately at equal distances on the circumference of the tyre tread.

8. Tyre tread for vehicle tyre according to claim 1, characterized in that one or more tread pattern pieces are provided with indicators presenting a series of numbers such that the value of the numbers of the series grow from the margins of the tread pattern piece towards its middle line, whereby uneven wearing of the tread in the axial direction of the tyre is readily disclosed.

9. Tyre tread for vehicle tyre according to claim 8, characterized in that the series of numbers are mutually different.

10. Tyre tread for vehicle tyre, said tread being provided with main grooves and with tread pattern pieces, circumferential ribs and/for tread pieces, the surface of said tread pattern pieces, ribs and/or tread pieces being in contact with a road and having sipes formed into the surface thereof to improve the grip with the road, in which tread a groove piece has been formed in the main groove between the side walls thereof, the top surface of which groove piece being parallel with the tread surface and located radially lower than the tread surface, in which top surface indicators are provided indicating groove depth of a main groove, said indicators being formed as sipes extending in a radial direction into the tyre tread, the cross-section of each indicator in the direction of the tread surface being formed into a number, characterized in that the number extends over the whole radial extension of the indicator and directly denotes a minimum remaining depth of the main groove, whereby each indicator disappears from the tread when wearing of the tread has advanced to the groove depth indicated by the number of the indicator, and that a momentary groove depth can be read from those indicators of the indicators still remaining in the tread which have the number disclosing the highest value.

11. Tyre tread for vehicle tyre according to claim 10, characterized in that the indicators form at least one group of indicators and that the depth of each indicator of a group increases by predetermined steps from the lowest depth to the deepest depth.

12. Tyre tread for vehicle tyre according to claim 10, characterized in that the groove piece has been formed attached only to a first tyre part bordering the groove and unattached to a second tyre part bordering the opposite side of the groove.

13. Tyre tread for vehicle tyre according to claim 10, characterized in that the deepest indicators are at least 1–2 mm less deep than the main grooves so that they are able to warn of a small remaining groove depth.

14. Tyre tread for vehicle tyre according to claim 10, characterized in that the groove piece is so stepped that one indicator is formed in each step, so that the highest step has the indicator indicating the highest groove depth and the lowest step has the indicator indicating the lowest groove depth.

15. Tyre tread for a vehicle tyre, comprising:

a main groove having a groove depth;

at least one tread portion adjacent to or in the main groove having an outer surface; and at least one group of multiple indicators positioned on the surface of the at least one tread portion, wherein each of the multiple indicators comprises a sipe formed into a number, the number extending radially into the tyre tread from the surface of the at least one tread portion to one of multiple predetermined depths not exceeding the groove depth, the number directly denoting the difference in depth between the predetermined depth and the groove depth in a predetermined unit of measure.

16. The tyre tread of claim 15, wherein the tread portion is a circumferential rib.

17. The tyre tread of claim 15, wherein the tread portion is a pattern piece.

18. The tyre tread of claim 15, wherein the tyre tread further comprises a circumferential rib adjacent to the main groove having an outer surface, and wherein the tread portion is in the main groove and has a surface parallel to but radially lower than the surface of the circumferential rib.

19. The tyre tread of claim 15, wherein the tyre tread further comprises a pattern piece adjacent to the main groove having an outer surface, and wherein the tread portion is a groove piece formed between a first and a second opposite wall of the main groove having a surface parallel to but radially lower than the surface of the pattern piece.

20. The tyre tread of claim 15, wherein the at least one tread portion is attached to a first groove wall but is unattached to a second groove wall.

21. The tyre tread of claim 15, wherein the tread portion has multiple parallel surfaces, each multiple parallel surface comprising one of the multiple indicators of a group.

22. The tyre tread of claim 15, wherein the multiple predetermined depths comprise evenly spaced depths progressing from shallowest to deepest.

23. The tyre tread of claim 15, wherein the multiple predetermined depths comprise unevenly spaced depths progressing from shallowest to deepest, wherein the depths of the deeper indicators are spaced more closely together than the depths of the shallower indicators.

24. The tyre tread of claim 15, wherein the deepest of the multiple predetermined depths is 2 millimeters shallower than the groove depth.

25. The tyre tread of claim 15, wherein a first of the group of multiple indicators is positioned on a first side of a circumferential middle line of the tyre tread, and a second of the group of multiple indicators is positioned on a second side of the circumferential middle line at a location equally distal from the circumferential middle line as the first of the group of multiple indicators.

* * * * *

UNITED STATES PATENT AND TRADEMARK OFFICE
CERTIFICATE OF CORRECTION

PATENT NO. : 6,523,586 B1
DATED : February 25, 2003
INVENTOR(S) : Eromäki et al.

It is certified that error appears in the above-identified patent and that said Letters Patent is hereby corrected as shown below:

<u>Column 1,</u>
Line 43, "No. U.S. Pat. No." should read -- U.S. Pat. No. --.

<u>Column 7,</u>
Line 60, "from" should read -- form --.

Signed and Sealed this

Twenty-eighth Day of March, 2006

JON W. DUDAS
*Director of the United States Patent and Trademark Office*